(12) United States Patent
Hisakawa

(10) Patent No.: US 8,355,086 B2
(45) Date of Patent: Jan. 15, 2013

(54) INFORMATION DISPLAY

(75) Inventor: Kohji Hisakawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 272 days.

(21) Appl. No.: 12/682,087

(22) PCT Filed: Jul. 16, 2008

(86) PCT No.: PCT/JP2008/062816
§ 371 (c)(1),
(2), (4) Date: Apr. 8, 2010

(87) PCT Pub. No.: WO2009/057360
PCT Pub. Date: May 7, 2009

(65) Prior Publication Data
US 2010/0238365 A1    Sep. 23, 2010

(30) Foreign Application Priority Data

Oct. 30, 2007  (JP) ................................ 2007-282021

(51) Int. Cl.
*G02F 1/1335* (2006.01)
*G02F 1/133* (2006.01)
(52) U.S. Cl. ........................................... 349/11; 349/23
(58) Field of Classification Search .................... 349/11, 349/23
See application file for complete search history.

(56) References Cited

U.S. PATENT DOCUMENTS

| | | | |
|---|---|---|---|
| 5,596,671 A * | 1/1997 | Rockwell, III | 385/147 |
| 5,751,388 A * | 5/1998 | Larson | 349/96 |
| 6,265,984 B1 * | 7/2001 | Molinaroli | 340/815.4 |
| 6,748,243 B1 * | 6/2004 | Kubo et al. | 455/569.1 |
| 6,779,401 B2 * | 8/2004 | Montagnon | 73/489 |
| 2004/0092284 A1 * | 5/2004 | Satoh et al. | 455/550.1 |
| 2004/0189947 A1 * | 9/2004 | Hattori et al. | 353/13 |
| 2005/0057437 A1 * | 3/2005 | Sato | 345/4 |
| 2006/0135226 A1 * | 6/2006 | Won et al. | 455/575.3 |
| 2006/0176500 A1 * | 8/2006 | Hosoi et al. | 358/1.14 |
| 2006/0229116 A1 * | 10/2006 | Ishihara et al. | 455/575.3 |
| 2007/0004484 A1 * | 1/2007 | Imura | 463/7 |
| 2007/0004487 A1 * | 1/2007 | Imura | 463/9 |
| 2007/0058397 A1 | 3/2007 | Aoki et al. | |
| 2007/0066379 A1 * | 3/2007 | Imura | 463/16 |
| 2007/0242887 A1 * | 10/2007 | Matsushita et al. | 382/209 |
| 2008/0041282 A1 * | 2/2008 | Goschy et al. | 108/141 |
| 2010/0003023 A1 * | 1/2010 | Takahashi | 396/55 |

(Continued)

FOREIGN PATENT DOCUMENTS

CN    1763804 A    4/2006

(Continued)

OTHER PUBLICATIONS

Official Communication issued in International Patent Application No. PCT/JP2008/062816, mailed on Aug. 19, 2008.

*Primary Examiner* — K. Cyrus Kianni
(74) *Attorney, Agent, or Firm* — Keating & Bennett, LLP

(57) ABSTRACT

An information display 100 according to the present invention, comprising a housing 60 having an opening 65, a display member 10 accommodated within the housing 60, a translucent protective member 70 covering the opening 65 of the housing 60 and allowing a display provided by the display member 10 to be visible, and a magnet 80 disposed within the housing 60.

6 Claims, 6 Drawing Sheets

U.S. PATENT DOCUMENTS

2010/0234062 A1 * 9/2010 Ito et al. .................. 455/550.1

FOREIGN PATENT DOCUMENTS

| JP | 07-010776 U | | 2/1995 |
|---|---|---|---|
| JP | 2000-235360 A | | 8/2000 |
| JP | 2000-250450 A | | 9/2000 |
| JP | 2005-191788 | * | 7/2005 |
| JP | 2005-191788 A | | 7/2005 |
| JP | 2007-086649 A | | 4/2007 |
| WO | 2006/059413 A1 | | 6/2006 |

* cited by examiner

INFORMATION DISPLAY

TECHNICAL FIELD

The present invention relates to an information display for outdoor installation.

BACKGROUND ART

As an information display for outdoor installation, such as, for example, a CRT display using a cathode-ray tube and an LCD display using liquid crystal have been well-known. Especially, an LCD display is beginning to predominate as an information display since being thin and light-weight, having a broader range of installation conditions.

Such information displays are, for being installed in rough environments such as roads and trains, easy to allow, for example, suspended dust to intrude into the display device. Among such dust, metallic powder such as iron powder largely affects the device and often causes such as failures. Considering the foregoing, for example, the Patent Literature 1 has been known as a dust intrusion preventing technology for a display device.

[Patent Literature 1]: Japanese Unexamined Patent Publication No. 2007-86649

Problem to be Solved by the Invention

The invention disclosed in the Patent Literature 1 prevents dust intrusion by achieving a closed state of the device without superposing the opening. However, even with this configuration, a gap may be formed in the chassis forming the device, and moreover, the metallic powder such as iron powder may intrude even from the slight gap due to its small particle diameter.

DISCLOSURE OF THE INVENTION

The present invention has been completed on the basis of the above background, with an object of providing a highly reliable information display, capable of preventing intrusion of metallic powder such as iron powder into the display member, thereby suitably preventing a failure of the display member from occurring.

Means for Solving the Problem

For the purpose of solving the above problem, the present invention provides an information display comprising: a housing having an opening, a display member accommodated within the housing, a translucent protective member for covering the opening of the housing and allowing a display provided by the display member to be visible, and a magnet disposed within the housing.

According to such information display, the magnetic attraction of the magnet disposed within the housing realizes absorption and collection of the metallic powder such as iron powder intruded into the housing. As a result, prevention or suppression of the intrusion of the metallic powder into the display member is possible, enabling prevention or suppression of a failure of the display member caused thereby.

BEST MODE FOR CARRYING OUT THE INVENTION

Figure 1:
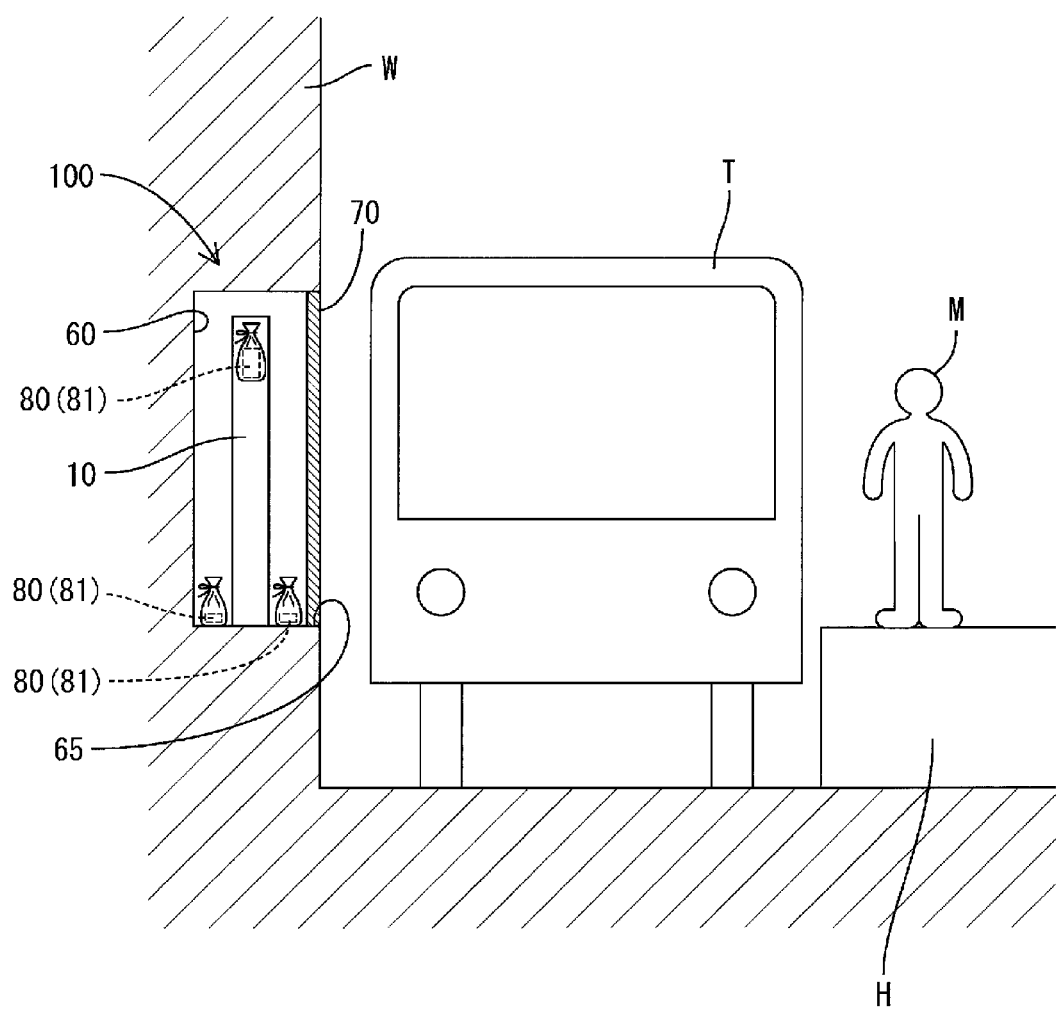
FIG. 1 is an explanatory view schematically showing one example of an information display according to the present invention, being installed in a train station platform.
Figure 2:
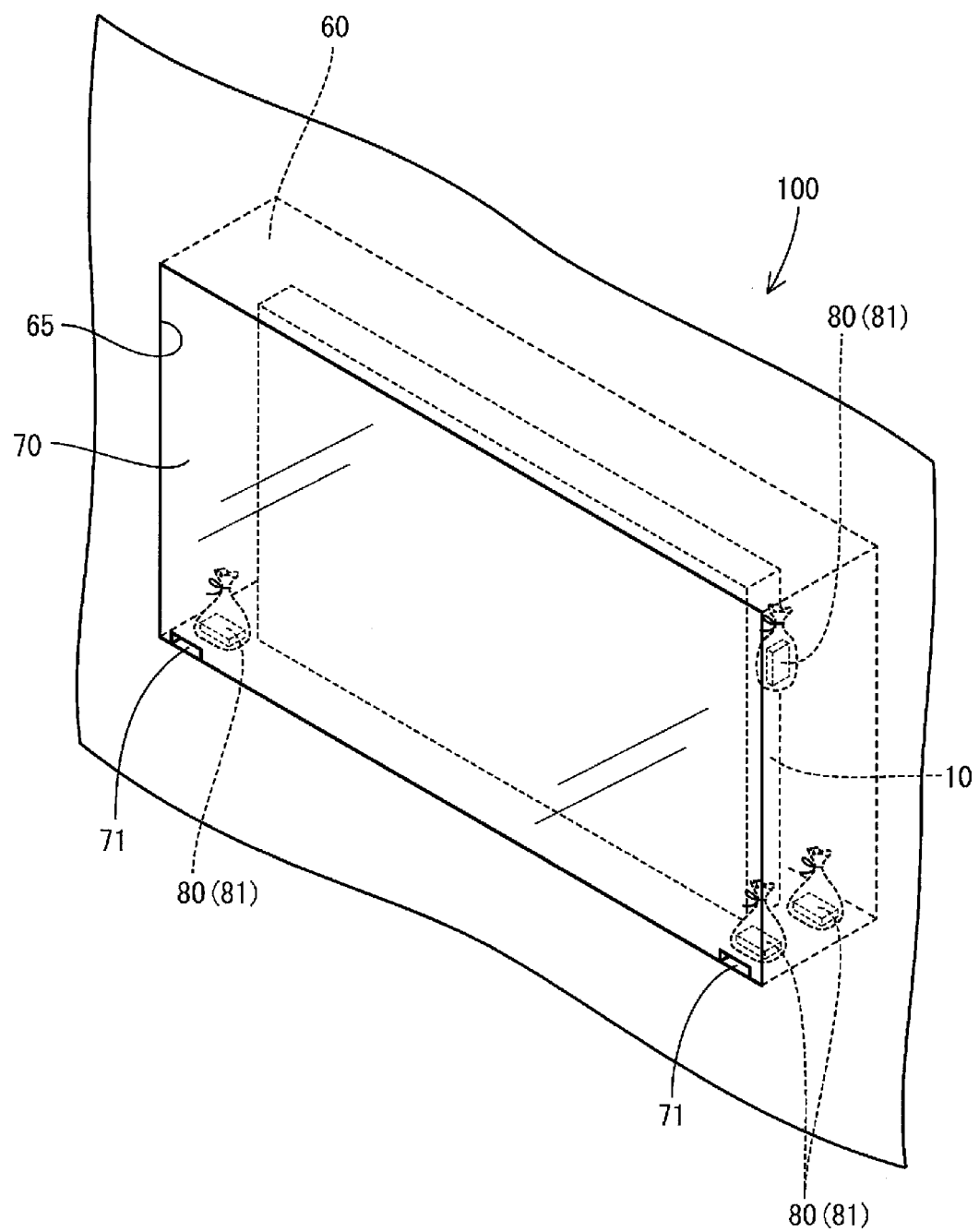
FIG. 2 is a perspective view showing a general configuration of the information display.
Figure 3:
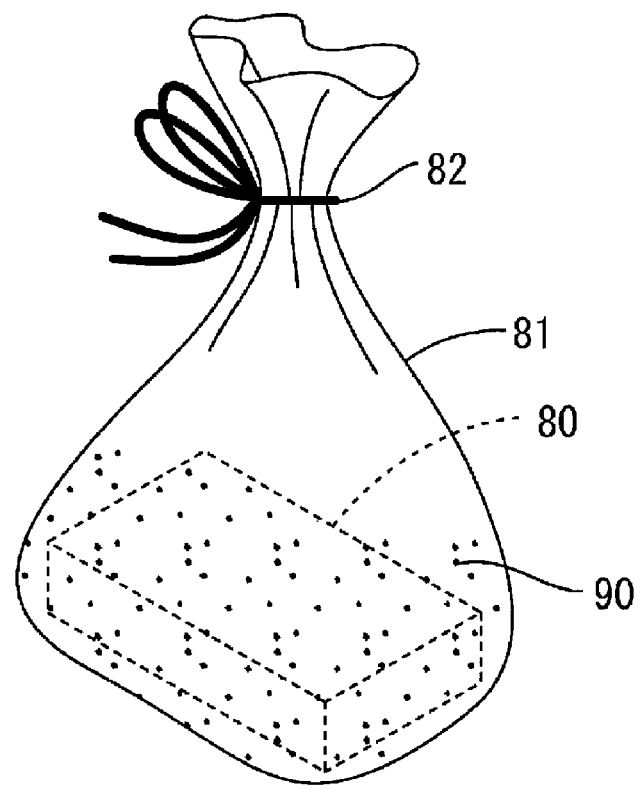
FIG. 3 is an explanatory view showing a mode at the time of using a magnet provided in the information display.
Figure 4:
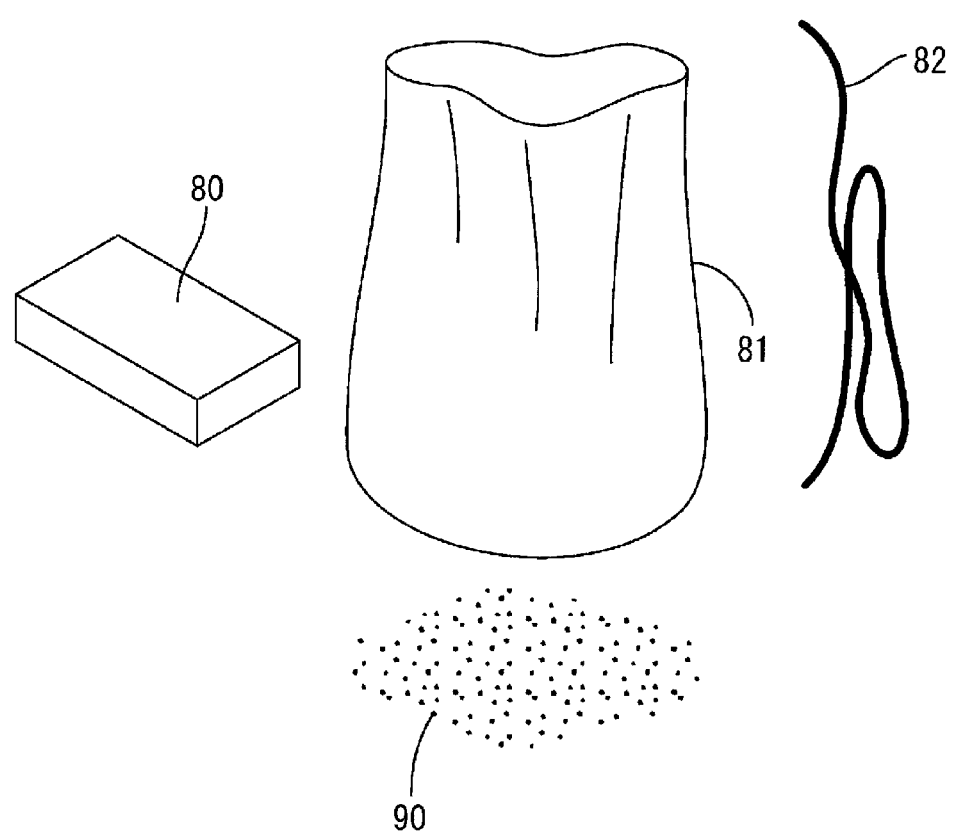
FIG. 4 is an explanatory view showing a mode at the time of cleaning off the magnet.
Figure 5:
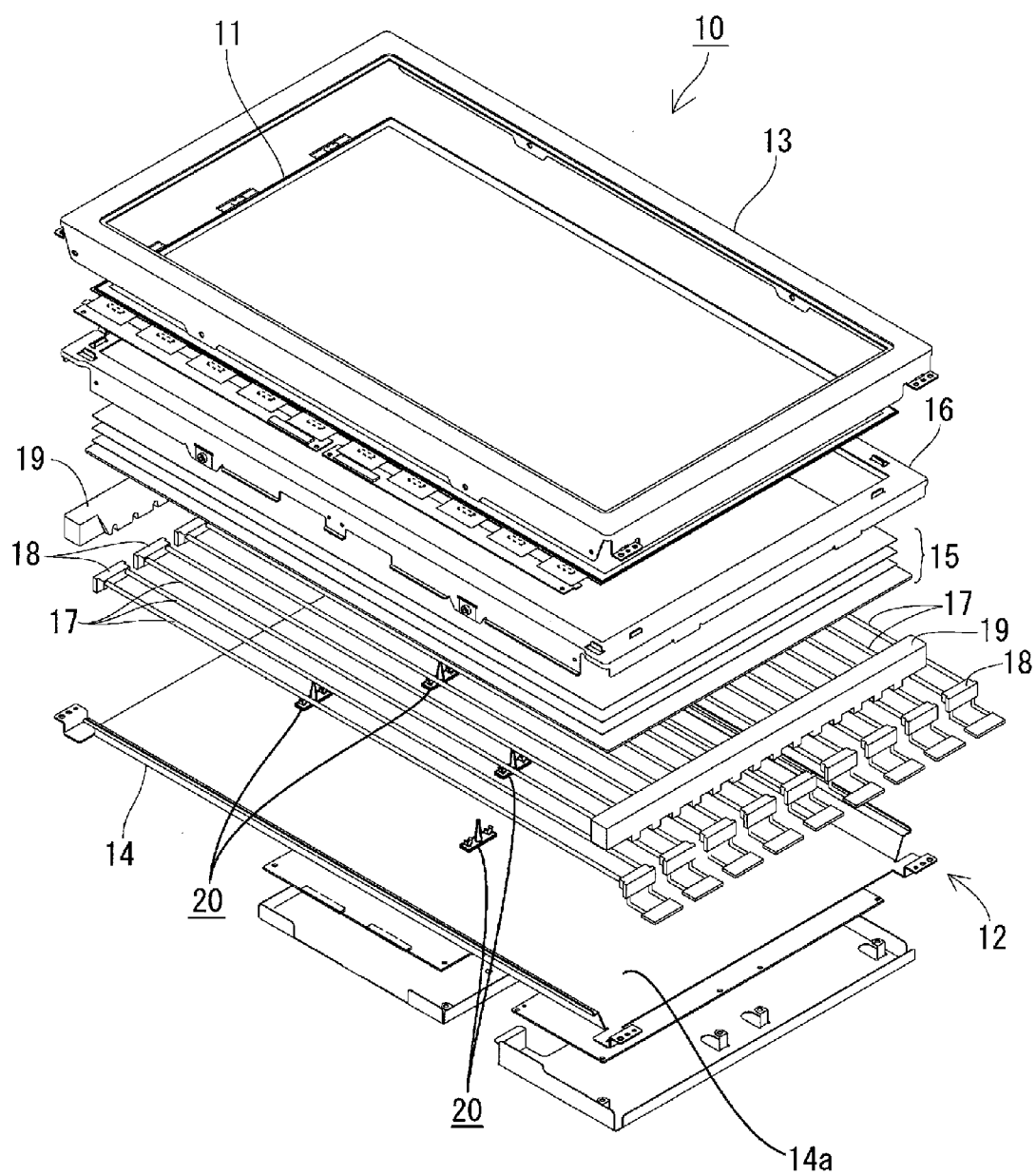
FIG. 5 is an exploded perspective view showing a general configuration of a liquid crystal display device provided in the information display.
Figure 6:
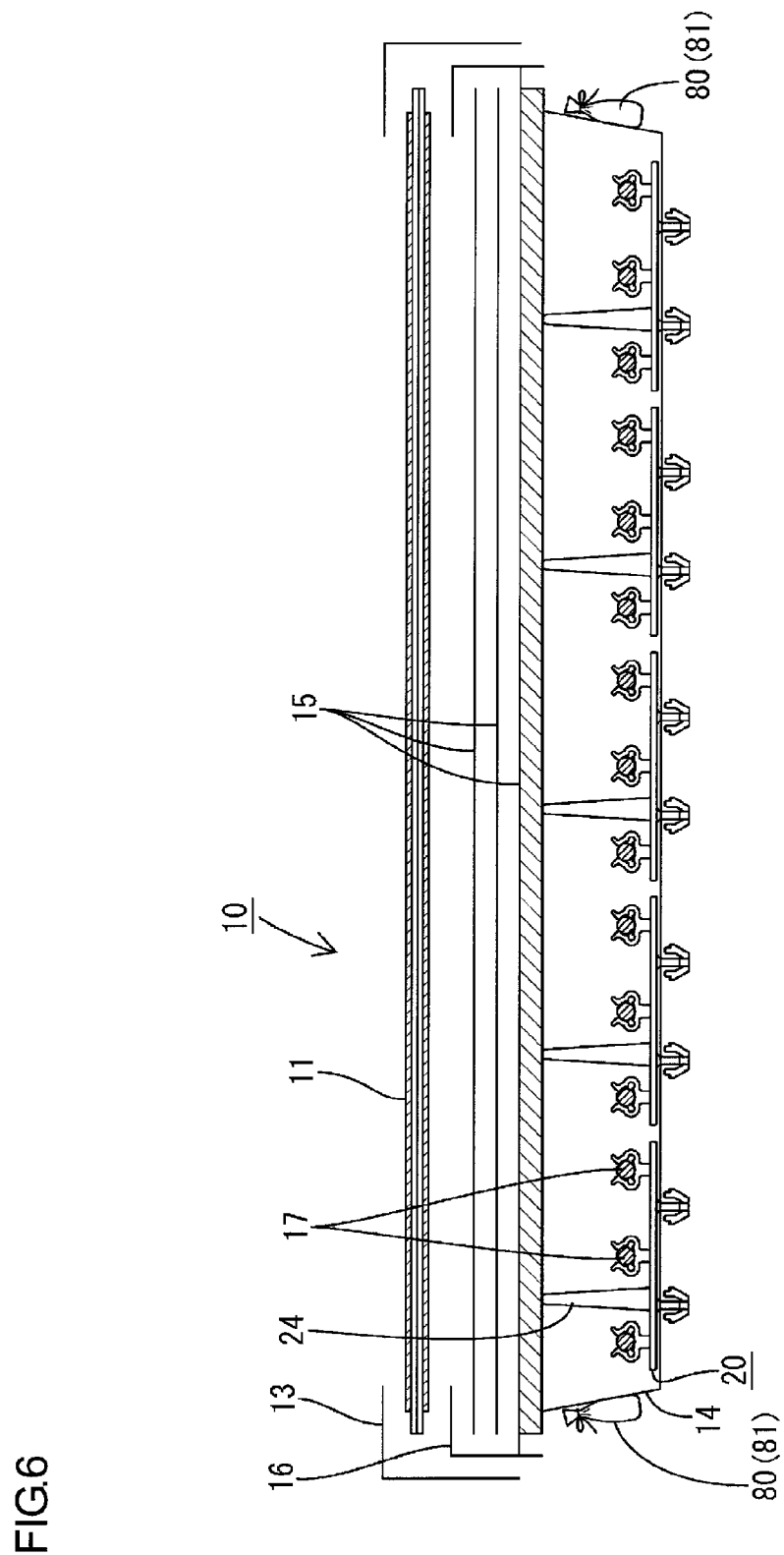
FIG. 6 is a cross-sectional view showing a general configuration of the same liquid crystal display device.

In what follows, one aspect embodying the present invention is explained with reference to the figures. FIG. 1 is an explanatory view schematically showing one example of an information display 100 according to the present invention, being installed in a train station platform; FIG. 2 is a perspective view showing a general configuration of the information display 100; FIG. 3 is an explanatory view showing a mode at the time of using a magnet 80 provided in the information display 100; FIG. 4 is an explanatory view showing a mode at the time of cleaning off the magnet 80; FIG. 5 is an exploded perspective view showing a general configuration of a liquid crystal display device 10 provided in the information display 100; FIG. 6 is a cross-sectional view showing a general configuration of the same liquid crystal display device 10.

As shown in FIG. 1, an information display 100 provides data of moving image or still image such as advertisement to a person (viewer) M who is waiting for a train T at a train station platform H, and is disposed within a housing 60 installed on a wall W of the train station platform H. The housing 60 may be formed by boring a hole in the cement wall W and laying a chassis made of metal or resin in the hole.

A liquid crystal display device (display member) 10 is disposed within such housing 60, and moving image or still image such as advertisement is displayed on the display face. Here, the liquid crystal display device 10 stands on the bottom of the housing 60, however, the device may be fitted into the back wall of the housing 60 or hung from the upper wall of the housing 60. The display of the liquid crystal display device 10 may be controlled by a controller mounted inside the liquid crystal display device 10 or by a wireless or wired controller installed in such as a station management office as a unit separated from the liquid crystal display device 10.

The housing 60 has an opening 65 in the front (in other words, the display providing side of the liquid crystal display device 10), with a glass window (translucent protective member) 70 provided so as to cover the opening 65. This glass window 70 certainly secures a clear visibility of the display, and at the same time, preventing and suppressing such as metallic powder and dust to directly fly onto the liquid crystal display device 10. This glass window 70 is provided with a hole 71 in a manner so as to penetrate the glass window 70 as shown in FIG. 2. This hole 71 enables the ventilation from inside and outside the housing 60 or the removal of moisture generated due to such as dew condensation occurred within the housing 60. Additionally, instead of the glass window 70, a resin substrate made from such as acrylic may be provided for covering, in consideration of such as damage prevention.

On the other hand, a magnet 80 in a housed-state in a housing bag 81 is accommodated within the housing 60. This magnet 80 is made from for example a permanent magnet such as ferrite magnet and neodymium magnet, and here the one in a rectangular parallelepiped shape of a few centimeters square is employed. In the present embodiment, the magnet 80 is, for example, in a housed-state in the resin-made housing bag 81 and accommodated within the housing 60 as shown in FIG. 3. In this case, the housing bag 81 is constituted with its opening sealed with such as a lace 82 (zip fastener may be used), and made of a material capable of allowing the magnetism of the magnet 80 to penetrate therethrough.

Here, the configuration of the liquid crystal display device 10 is explained. The liquid crystal display device 10, as shown in FIGS. 5 and 6, comprises a liquid crystal panel 11 in a rectangular shape and a backlight device (a lighting device) 12 as an external light source, and they are integrally held by a bezel 13. Among these, the liquid crystal panel 11 is constituted in a manner that a pair of glass substrates are stuck together having a prescribed gap there between, and a liquid crystal is sealed between both the glass substrates. One glass substrate is provided with such as a switching element (for example, TFT) connected with a source wiring and a gate wiring orthogonal each other and a pixel electrode connected with the switching element, while the other one is provided with such as counter electrodes and a color filter composed of each color such as R, G, and B.

Next, the backlight device 12 is explained. The backlight device 12 is so-called a direct type backlight device and comprises light sources (here, cold cathode fluorescent lamps 17 are used as high-voltage discharge tubes) arranged right under the rear face of the panel face (display face) of the liquid crystal panel 11, in a row along the panel face.

The backlight device 12 comprises a metallic chassis 14 in a nearly box shape with the upper face side opened, a plurality of optical sheets 15 (in the Figure, sequentially from below, a diffuser plate, a diffuser sheet, a lens sheet, and a reflecting polarization plate) to be mounted so as to cover the opening of the chassis 14, a frame 16 for holding these optical sheets 15 in the chassis 14, a cold cathode fluorescent lamp (a tubular light source) 17 as a lamp housed within the chassis 14, a rubber-made lamp socket 18 capable of protecting the joint part between the electrode of the cold cathode fluorescent lamp 17 and a harness (conductive wire) and fixing the cold cathode fluorescent lamp 17 to the chassis 14 while at the same time of absorbing the vibration, a lamp holder 19 for collectively covering the group of cold cathode fluorescent lamps 17, and a lamp clip 20 for holding an intermediate part of the cold cathode fluorescent lamp 17 excepting both ends. Additionally, in the backlight device 12, the side of the optical sheet 15 rather than the cold cathode fluorescent lamp 17 is the light emission side.

The nearly box-shaped chassis 14 is constituted mainly by a metal, and the inner surface side of the chassis 14 (the light source side) is formed as a reflecting surface (light reflecting surface) 14a made of a light reflective sheet. With such chassis 14 including the light reflecting surface 14a, the light emitted from the cold cathode fluorescent lamp 17 can be reflected to the side of the optical sheet 15 such as a diffuser plate. Additionally, the light reflective sheet may be constituted by such as, for example, a resin sheet having light reflectivity.

The cold cathode fluorescent lamp 17 is constituted to have a tubular shape thin and long in one direction and be housed within the chassis 14, in a manner so as to be in great numbers (here, 18 lamps) and aligned parallel with each other (arranged in parallel), with its length direction (axis line direction) matching the long side direction of the chassis 14. On the other hand, the lamp clip 20 for fitting the cold cathode fluorescent lamps 17 into the chassis 14 functions as a light source supporting member having a clip shape, and is made of a synthetic resin (for example, polycarbonate).

The liquid crystal display device 10 having such configuration is installed within the housing 60, and forms the information display 100 for providing data of moving image or still image such as advertisement as mentioned above. The train station platform H where the information display 100 is installed is in a rough environment, and a great amount of iron powder, sand, and dust, which may be generated between, for example, the wheel and the rail, may be dispersed and flew onto the information display 100. Here, the present embodiment intends that, as shown in FIGS. 1 and 2, by disposing the magnet 80 within the housing 60, the dispersed metallic powder such as iron powder is absorbed, so as to preliminarily prevent the intrusion into the liquid crystal display device 10 as a main display body.

The magnet 80 in the present embodiment is firstly arranged in the rear surface side of the liquid crystal display device 10 in the housing 60. In this case, it is difficult for the viewer M as a display viewing person to see the magnet 80 housed in the housing bag 81, and as a result, the metallic powder such as iron powder can be absorbed and collected without degrading the appearance.

In addition, the magnet 80 in the present embodiment is secondly arranged in the front surface side of the liquid crystal display device 10 in the housing 60, near the hole 71 in the glass window 70. In this case, disposing the magnet 80 near the hole 71 allows the metallic powder intruding from the hole 71 to be certainly absorbed and collected.

And also, the magnet 80 in the present embodiment, thirdly, is attached directly to the chassis 14 of the liquid crystal display device 10 accommodated within the housing 60. In this case, the failure that the metallic powder intrudes from each gap between the chassis 14 and the liquid crystal panel 10 and the chassis 14 and the backlight device 12, those forming the liquid crystal display device 10, can be certainly prevented.

Additionally, the magnet 80 is housed in the housing bag 81 as mentioned above, and thereby improving the appearance, while making it easy to clean off the absorbed metallic powder. In particular, when cleaning off (collecting) the metallic powder 90 absorbed by the housing bag 81 as shown in FIG. 3, uncoiling the lace 82 as shown in FIG. 4 and removing the magnet 80 out from the housing bag 81 allows the metallic powder 80 absorbed by the housing bag 81 to be easily and certainly collected (cleaned). In other words, rather than absorbing the metallic powder 90 with the magnet 80 directly, it is absorbed through the housing bag 81, so that collection (cleaning) of the metallic powder 90 is extremely simplified.

As mentioned, according to the information display 100 in the present embodiment, the magnetic attraction of the magnet 80 disposed within the housing 60 realizes absorption and collection of the metallic powder 90 such as iron powder intruded into the housing 60. As a result, prevention or suppression of the intrusion of the metallic powder 90 into the liquid crystal display device 10 is possible, enabling prevention or suppression of a failure of the liquid crystal display device 10 caused thereby.

As a path, through which the metallic powder 90 may intrude into the liquid crystal display device 10, there are gaps between the bezel 13 and the liquid crystal panel 11, the bezel 13 and the backlight device 12, the frame 16 and the optical sheet 15, and the frame 16 and the chassis 14. The magnet 80 may be selectively disposed near the gap that may be formed as mentioned above.

The embodiment according to the present invention has been thus described in the above. However, the present invention is not limited to the aspects described in the above with reference to the accompanying Figures, and, for example, the following can also be included in the technical scope of the present invention. In other words, the present embodiment suggests the example in which the information display 100 is installed on the wall W of the train station platform. H, however, other than the above, the present invention may be applied to an information display that is facing a road where vehicles are passing by.

The invention claimed is:

1. An information display comprising:
   a display member including a display panel and a chassis housing the display panel;
   a housing including an opening and housing the display member;
   a translucent protective member including a ventilation hole, the translucent protective member being arranged at a distance from the display member and arranged to cover the opening of the housing such that an image on the display member is visible; and
   a plurality of magnets disposed within the housing, at least a first one of the plurality of magnets being arranged closer to a rear of the information display than the display member, at least a second one of the plurality of magnets being arranged adjacent to the ventilation hole and between the display member and the transparent protective member such that the at least a second one of the plurality of magnets is closer to a front of the information display than the display member, and at least a third one of the plurality of magnets being directly mounted to the chassis of the display member.

2. The information display according to claim 1, wherein the housing is installed on a wall of a platform of a train station.

3. The information display according to claim 1, wherein the display member is a liquid crystal module.

4. The information display according to claim 3, wherein the display panel of the liquid crystal module is a liquid crystal panel including a liquid crystal layer arranged between a pair of substrates and a lighting device arranged to provide an illuminating light permitting a display of the liquid crystal panel, and the liquid crystal panel and the lighting device are unitized through a bezel.

5. The information display according to claim 4, wherein the lighting device comprises a light source, the chassis being arranged to house the light source and including an opening in a light emission side, an optical sheet disposed in an opening side of the chassis, and a frame arranged to fix the optical sheet to the chassis.

6. The information display according to claim 1, wherein the plurality of magnets are respectively housed in ones of a plurality of housing bags capable of allowing magnetism of the magnet to penetrate therethrough.

* * * * *